United States Patent [19]
Schmidt

[11] Patent Number: 5,497,231
[45] Date of Patent: Mar. 5, 1996

[54] MONOCHROMATOR HAVING AN OSCILLIATING MIRROR BEAM-DIFFRACTING ELEMENT FOR SPECTROMETERS

[76] Inventor: Werner Schmidt, Meisenweg 7, D-78465 Konstanz, Germany

[21] Appl. No.: 250,710

[22] Filed: May 26, 1994

[51] Int. Cl.⁶ ........................................ G01J 3/06
[52] U.S. Cl. ............................. 356/334; 356/328
[58] Field of Search .................... 356/308, 326, 356/328, 332, 334, 215; 359/199, 213, 214

[56] References Cited

U.S. PATENT DOCUMENTS

| | | | |
|---|---|---|---|
| 2,630,736 | 3/1953 | Beitz | 356/308 |
| 4,225,233 | 9/1980 | Ogan | 356/308 |
| 4,752,129 | 6/1988 | Izumi et al. | 356/328 |
| 5,303,165 | 4/1994 | Ganz et al. | 356/328 X |

FOREIGN PATENT DOCUMENTS 3734588  6/1992  Germany.
62-47524  3/1987  Japan ........................ 356/328
3-239928  10/1991 Japan ........................ 356/328

OTHER PUBLICATIONS

Lowy et al "Vibrating Mirror Multiple–line display" IBM Tech. Disc. Bulletin, vol. 19 No. 5, p. 1775, Oct. 1976.

Primary Examiner—Vincent P. McGraw
Attorney, Agent, or Firm—Davis, Bujold & Streck

[57] ABSTRACT

The monochromator has, as a beam-diffracting element, a scanning mirror (3) which is fastened on a vibratory spring, preferably a spring-steel strap (8), clamped on one side. The vibratory spring is oscillated by way of an electromechanical self-energized oscillation circuit, a sensor (11a, 11b) which detects the deflection of the vibratory spring (8) is provided and whose output signal is used as a feedback signal for maintaining the oscillation of the vibratory spring (8). The amplitude of oscillation of the oscillating element can likewise be varied. With such a design it is possible to produce simply and inexpensively a monochromator with which a considerable spectral range can be swept and, in addition, the width and position of said spectral range can be variably adjusted.

14 Claims, 4 Drawing Sheets

MONOCHROMATOR HAVING AN OSCILLIATING MIRROR BEAM-DIFFRACTING ELEMENT FOR SPECTROMETERS

FIELD OF THE INVENTION

The invention concerns a monochromator for spectrometers, especially for single-beam spectrophotometers.

BACKGROUND OF THE INVENTION

Monochromators having a dispersing element such as a diffracting grate which spectrally decomposes the light passing through an entrance slit and having a beam-deflecting element for selecting the wavelength, are known already. Thus, for instance, German patent 37 34 588 describes a monochromator where the diffracting grate is stationary and a beam-deflecting element is rotated with computer control for selecting the wavelength. Such a beam-deflecting element can be, for instance, a revolving mirror or a prism. Stepping motors, a moving coil mechanism, a rotation vibrator, or a motor with trigger mechanism are especially mentioned as a computer-controlled drive for said rotating element. Depending on the efficiency required, the mechanical structure of said rotating elements and the electronic control thereof by means of a computer can be very expensive if a high scanning precision is needed with regard to the frequency range of the light and of the scanning range over the wavelength spectrum.

A simple control of the position and the width of the spectrum is not easily possible.

Therefore, the problem to be solved by the invention is to provide a monochromator for spectrometers which, with a simple structure and at reasonable cost, allows adjustment of the position and the width of the spectrum and also variation of said ranges.

SUMMARY OF THE INVENTION

Said problem is solved according to the invention with the characteristics.

The beam-deflecting element is accordingly a mechanically oscillating element having an adjustable amplitude of oscillation, a vibratory spring or a spring-steel strap clamped on one side and having secured to its free end a scanning mirror is preferably used for this, the oscillations of this element being controlled by a self-energized electromechanical oscillatory circuit. The inherent resonant frequency of said vibratory spring is determined by the kind of material of the spring and by the external measurements. The inherent frequency can be changed or adjusted within broad ranges by means of additional mechanical devices such as adjustable added materials or variation of length.

For deflection of the vibratory spring or of the spring-steel strap, an electromagnetic coil is provided which is part of the self-energized electromechanical oscillatory circuit. The oscillation frequency corresponding to the inherent resonant frequency of the spring is maintained by an electric feedback circuit. The latter contains a sensor which detects the deflection of the spring-steel strap. Said sensor can be, for instance, an optical sensor, substantially a light barrier, or an electromagnetic sensor such as a Hall-effect sensor. The oscillatory amplitude of the resonant vibrations of the spring-steel strap can be varied by varying the current amplitude of the electromagnetic coil. The amplitude determines here the spectral range that is traversed with the scanning mirror during a complete deflection of the spring-steel strap.

The use of a vibratory spring or of a spring-steel strap allows a simple and inexpensive construction of the monochromator where the center of oscillation and the deflection of oscillation can be electronically controlled within sufficiently broad ranges. The position of the center of oscillation is here correlated with the position of the selected spectral range whereas the amplitude of oscillation is correlated with the width of the spectral range. The position of the spectral range can be varied either by an adequate alignment of the vibratory spring or alternatively by rotating the dispersing element such as the diffracting grate.

BRIEF DESCRIPTION OF THE DRAWINGS

The embodiment of the invention is explained in detail with the aid of the drawings. In the drawing.

DETAILED DESCRIPTION OF THE PREFERRED EMBODIMENTS

Figure 1:
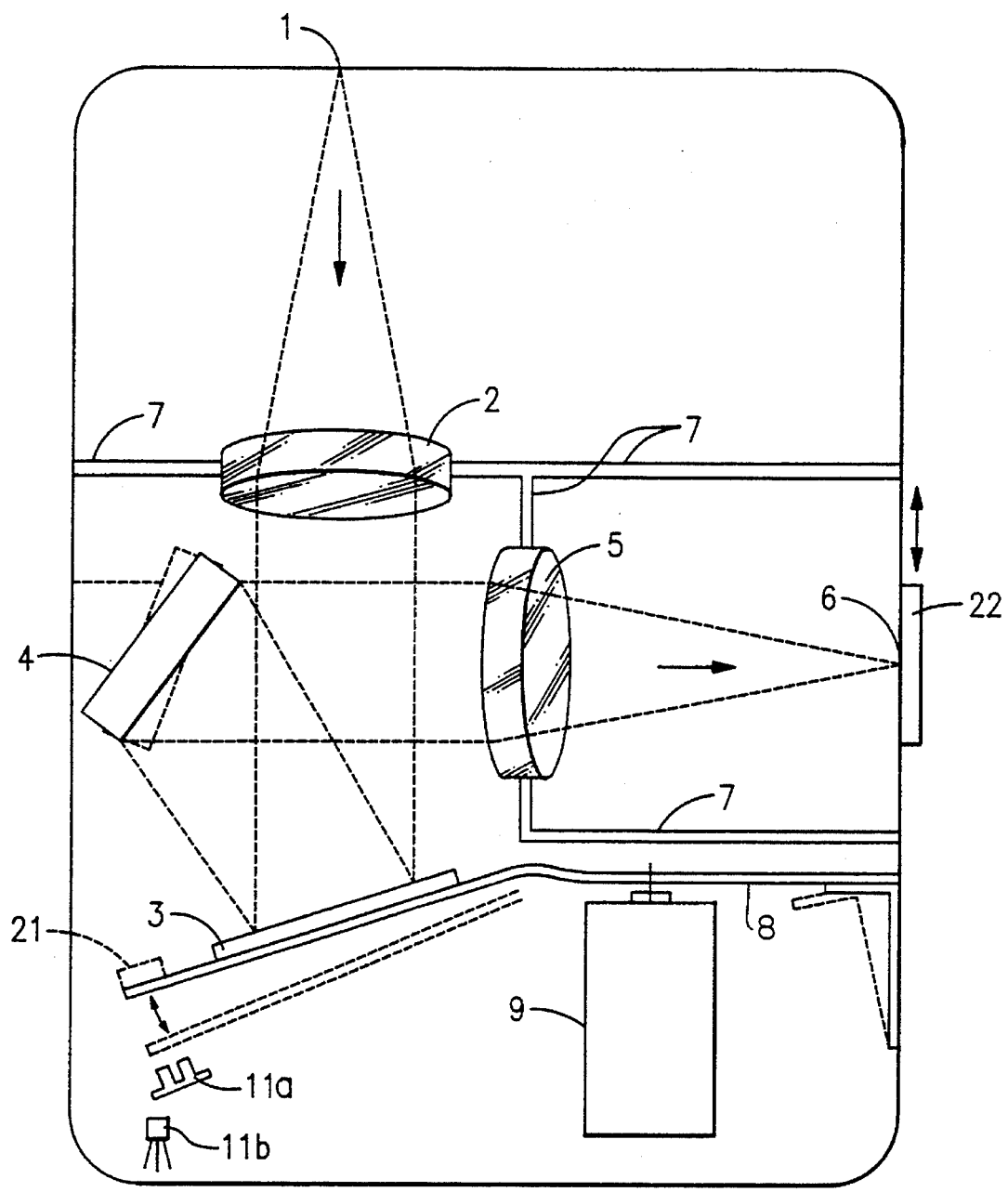
FIG. 1 shows a diagrammatic total view of a monochromator according to the invention with a scanning mirror which is situated on the free end of a spring-steel strap.

As described in more detail in said patent DE 37 34 588, the white light of an illuminating optical system strikes upon an entrance slit 1 of a monochromator and is collimated by an achromatic lens 2 upon an oscillatory mirror 3. The illuminating optical system is preferably constructed according to the cited patent, that is, the collimating optical system has, in consecutive order, a convergent lens, a filter and cylindrical lens which focuses the lamp light in the form of lines and not conventionally as in the form of circles.

The oscillatory mirror 3 reflects the collimated light falling upon it on a diffracting grate 4 such as a flat slit grate having 1200 lines per millimeter and a size of 23 by 23 by 9 millimeters. The grate 4 focuses with an achromatic optical system 5 the monochromatic light on an exit slit 6. According to said patent DE 37 34 588, the natural light is passed from here, either directly or via adequate photoconductors, to a test sample and/or a photodetector and is detected. A cylindrical lens is preferably provided, also behind said exit slit, which from the light beam focuses in the form of lines makes, in turn, a slight beam substantially circular in cross section.

The course of the beam in the monochromator is reversible, that is, both slits 1 and 6 are to be optionally used as entrance or exit slit. Both the entrance and the exit slits are separated from each other and also from the space of the grate by adequate diaphragms 7 whereby a portion of light infiltrated is reduced.

Figure 2:
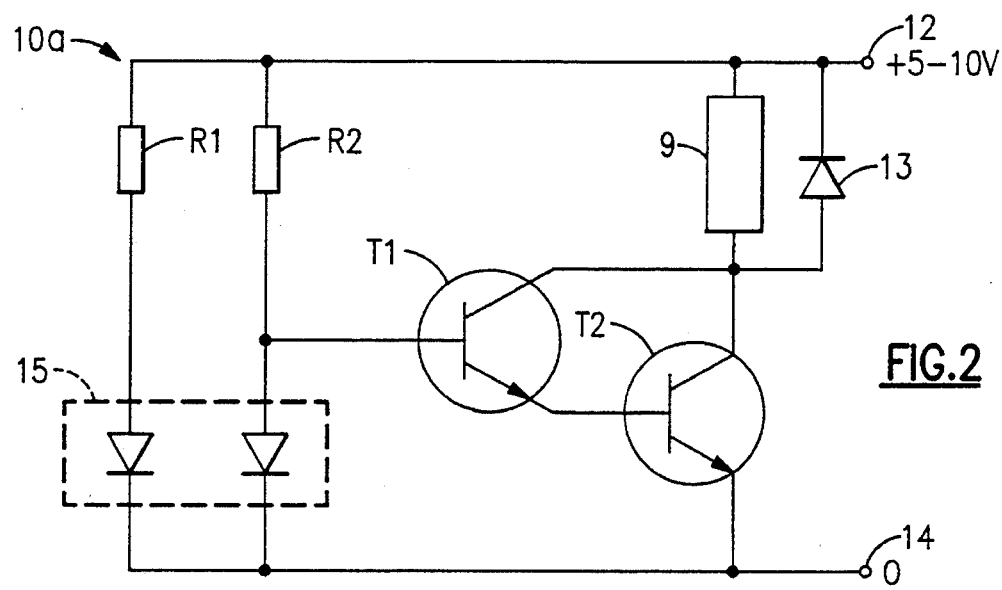
FIG. 2 shows a control circuit for the scanning mirror with a light barrier as a sensor for delivering a feedback signal.
Figure 3:
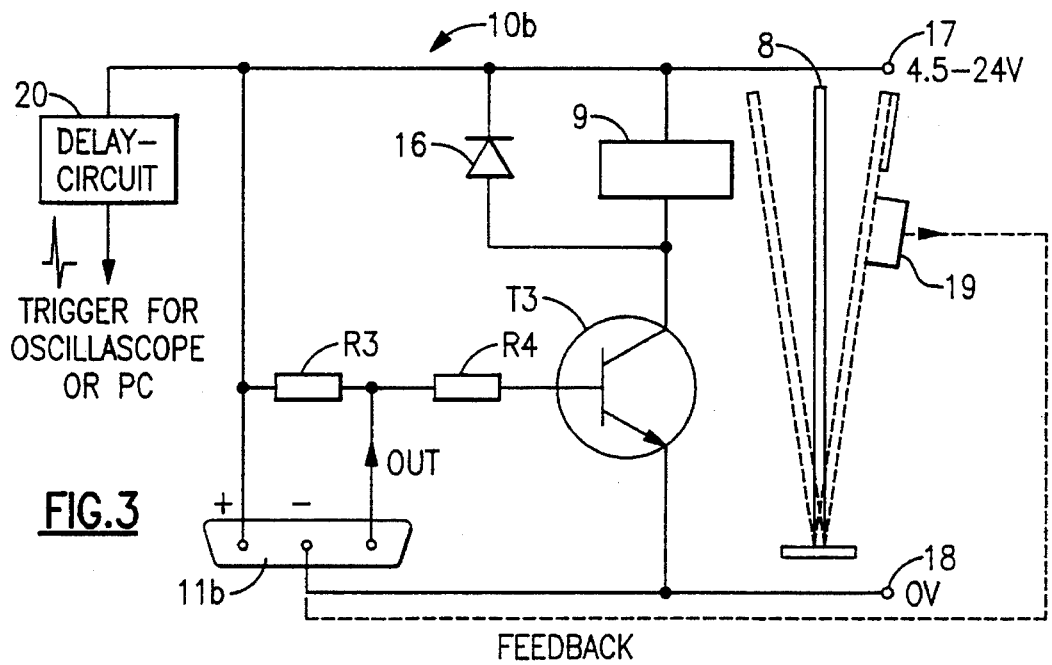
FIG. 3 shows a control circuit for the scanning mirror with a digital Hall-effect sensor for delivering a feedback signal.

The flat scanning mirror 3 is secured to a free end of a vibratory spring, in the form of a spring-steel strap 8, the other end of which is firmly clamped to the housing of the monochromator. The spring-steel strap 8 is oscillated by a small electromagnetic coil 9 which has its own electronic control circuit. Two designs of a control circuit, in the form of a self-energized electromagnetic oscillatory circuit, are shown in FIGS. 2 and 3 and designated with 10a and 10b, respectively. Depending on the amplitude of oscillation, frequencies of 50 Hz and much more can be attained. The coil 9 is part of the electronic control circuit.

A deflected position of the spring-steel strap 8 is shown in dotted lines in FIG. 1; two sensors 11a and 11b are also diagrammatically shown. The sensor 11a is a conventional light barrier interrupted by the deflected spring steep strap 8 whereas the alternatively used sensor 11b is a Hall-effect sensor which works in an analog or a digital manner. Both sensors are used to detect deflection of the spring-steel strap 8, the output signal thereof being used as feedback signal in the control circuits of FIGS. 2 and 3 for maintaining the oscillatory resonant frequency of the spring-steel strap 8. The spring-steel strap 8 having a naturally high quality factor, that is, a high Q value, which is a standard for the accuracy of the frequency, is determinant of frequency. It appears that oscillations of the air pressure or of the moisture only have a negligible effect upon the frequency of resonant oscillation.

Figure 2A:
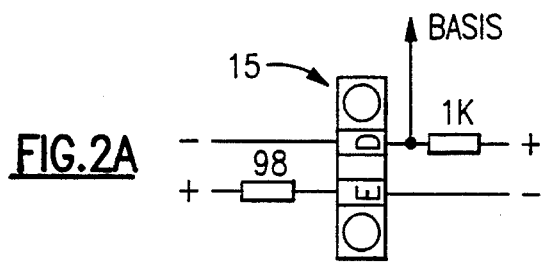
FIG. 2A diagrammatically shows the double diode 15 of FIG. 2.

The control circuit shown in FIG. 2 consists of two transistors T1 and T2 in a cascade circuit such as a transistor BC238 and a transistor BSY52. The juncture of both collectors is connected with one terminal of the coil 9, the other terminal of which is connected with the input terminal 12 of the control circuit 10a. The vibratory coil is here bridged by a diode 13. The emitter of the transistor T2 is connected with the other terminal 14 of the control circuit which is at ground or zero volts. Two resistances R1 and R2, switched in parallel which each respectively lead to one diode of a double diode 15, diagrammatically shown in the accessory illustration of FIG. 2A, are further connected with the input terminal, and is used as a light barrier. The point of attachment between the resistance R2 and the diode 15 is connected with the base of the first transistor T1.

The oscillatory frequency of the spring-steel strap 8 is determined by means of said electronic control circuit 10a as a self-energized electromagnetic oscillation circuit. By varying the input voltage of the control circuit 10a, in this case from +5 volts to +10 volts, the current of the coil 9 is varied and thus the amplitude of oscillation of the spring-steel strap 8.

The control circuit 10b, according to FIG. 3, has a transistor T3 such as a BSY52 transistor. The collector of said transistor is connected with one terminal of the coil 9 which is bridged by a diode 16, the other terminal of which is connected with an input terminal 17 of the control circuit 10b. The emitter of the transistor T3 is connected with the other terminal 18 of the control circuit. The voltage between both terminals 17 to 18 can likewise be varied, in this case from +4.5 volts to 24 volts. The input terminal 17 is connected with one terminal, in this case the +-terminal of the acoustic sensor, the minus terminal thereof is connected with the terminal 18. The output terminal of the Hall-effect sensor 10b is connected, via a resistor R3, with the (+)-terminal and in addition with a resistor R4 over which is directly controlled the base of the transistor T3. The Hall-effect sensor 10b reacts with a small magnet secured to the spring-steel strap 8 and, during the oscillation of the spring-steel strap, moves toward and away from the Hall-effect sensor 10b.

From the control circuits 10a and 10b a trigger signal can be derived in a conventional manner with the aid of a microcomputer for visualization of data or exposure of data; this takes place, as shown in FIG. 3, by means of a delay circuit 20 which processes and adequately delays the trigger signal in accordance with the requirements of shape, offset and amplitude. The output signal of said delay circuit 20 serves then directly as trigger signal for an oscilloscope or a computer.

By changing the supply voltage between the terminals 12 and 14 or 17 and 18 of the control circuit 10a or 10b, it is possible to vary the amplitude in accordance with the frequency from zero to a maximum value of about ±30° in the realized monochromator. In a diffracting grate having 1200 lines per millimeter and a focal length of the reproductive lenses of 50 millimeters, a maximum oscillation amplitude of the mirror with a deflection of the spring-steel strap results at about ±20°, a more than sufficient coverage of the whole visible spectral range, for instance, between 400 and 1000 nm.

As mentioned above and indicated in dotted lines in FIG. 1, the inherent resonant frequency of the spring-steel strap 8 can be varied and adjusted by means of small added weight 21 or setscrews.

Figure 4:
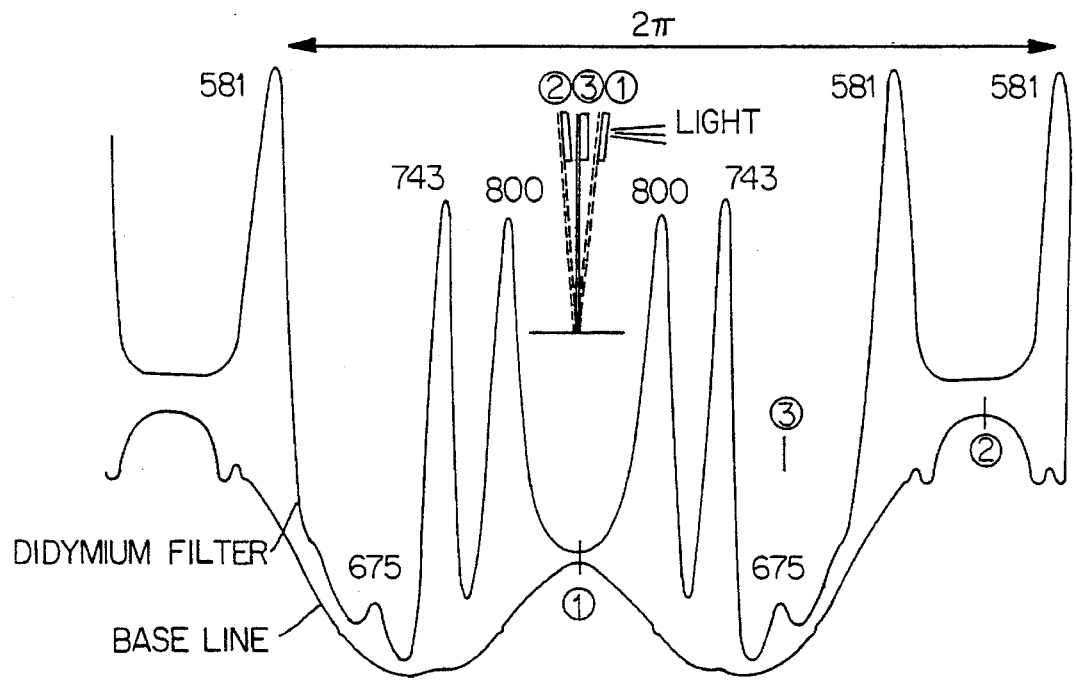
FIG. 4 shows a spectral exposure of a reference line and of a didymium filter in the range of from 500 to 900 nm over a full oscillation cycle of the scanning mirror, the reversal point of the mirror being plotted and marked in the accessory figure.
Figure 6:
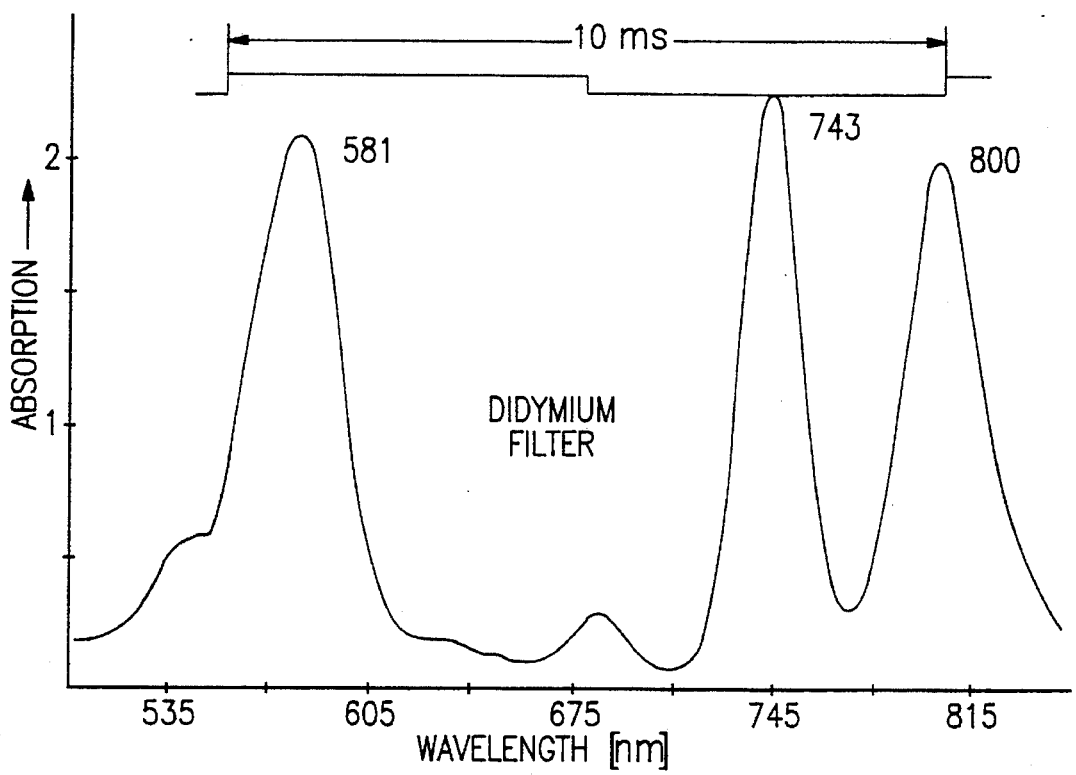
FIG. 6 shows a complete absorption spectrum of a didymium filter.
Figure 7:
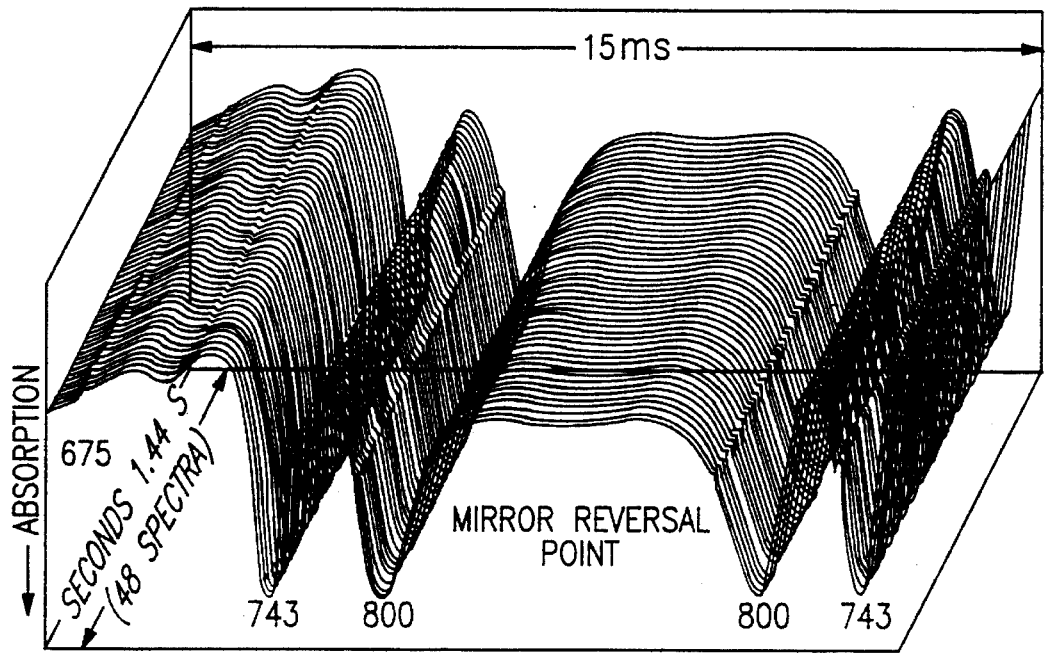
FIG. 7 shows an example of a multiple exposure of absorption spectra with a single beam spectrophotometer equipped with a monochromator according to the invention.

In the sample spectra of FIGS. 4, 6 and 7, a pocket flashlight bulb with a nominal capacity of 0.8 was used as a light source, as detector a red-sensitive, inexpensive photodiode of the BPW20 type switched as photoelement. The reply signal of the control circuit behaves logarithmically, the absorption signal A immediately resulting as $$A = \log I_o/I = \epsilon \cdot x \cdot c;$$

wherein $I_o$ is the incoming intensity,

I is the measured intensity at a given point,

A represents the absorption, $\epsilon$ the molar extinction coefficients, x the thickness of the specimen and c the concentration of the specimen.

In FIG. 4, an absorption spectrum is shown over a complete oscillation cycle of 2 $\pi$ of the spring-steel strap at a medium oscillation amplitude $A_s$, a spectral range between about 550 nm and 850 nm is covered. In this example, the oscillation frequency corresponds to about 30 Hz, that is, for a deflection of the scanning mirror, namely, for the angular range $\pi$, about 15 milliseconds are needed. The reversal points 1 and 2, the same as the zero passage of the mirror, are marked in the diagram and shown in the schema of the scan mirror in the accessory illustration of FIG. 4. The reference line shows a characteristic structure corresponding to the wavelength relationship of the whole system of a single-beam spectrophotometer. A didymium filter was additionally measured under the same conditions in order to gauge the calibration curves, since the chemical compounds of the rare earth materials produce comparatively sharp absorption peaks. The wavelengths of the most striking absorption peaks are plotted in that figure. An absorption spectrum is corrected by subtracting the reference line point for point and thus eliminating the effect of the apparatus.

The center of the spectrum can be adjusted by turning the stationary diffracting grate or by rotating the zero point position of the spring strap 8; these two possibilities are shown in dotted lines in FIG. 1. By varying the amplitude of the oscillation of the spring-steel strap, the width of the spectrum can be adjusted. It is thus possible, so to speak, to "zoom" upon any desired point in the spectrum with any spectroscopic dispersion, the optical components such as slits and the flux of light having, of course, a limiting effect. If the diffracting grate is turned, the angle of reflection changes and if the zero passage of the scanning mirror is rotated, the central angle of incidence changes.

Figure 5:
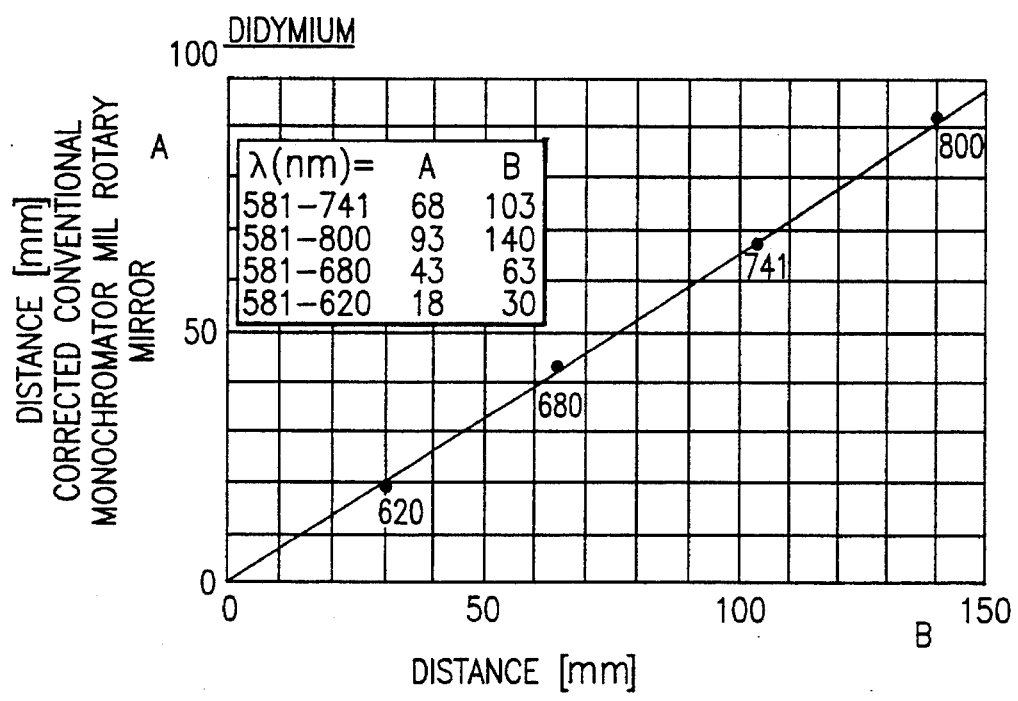
FIG. 5 shows a comparison of the linearity of wavelength of a traditional monochromator and of a monochromator according to the invention wherein the spectra of a didymium filter were exposed and each expressed in similar size and the existing peak differences were measured and plotted in millimeters.

It is known that in a diffracting grate the wavelength is proportional to the sine of the existing angle of rotation. For this reason, the linearization is effected entirely mechanically via a spindle mechanism in the conventional spectrometers. In this invention, the data is exposed via a computer program in machine language: after the start, by an initial trigger signal, 640 points with 14 bits of dispersion each are read in "freewheelingly" by an analog-to-digital converter, that is, linearly with the time being within 15 milliseconds. On the other hand, the oscillating scanning mirror describes a temporary sinusoidal wave whereby the wavelength scale is linearized. Said correlations were, in turn, verified with the aid of a didymium filter: the spectrum was first exposed by means of a conventional corrected McPearson monochromator, the wavelength positions of the master tapes are plotted on the coordinates, then the plotting was carried out on the abscissae with the monochromator according to the invention, see FIG. 5. The system accordingly works to a great extent linearly.

Under said conditions it is advantageous not to calibrate the wavelength positions and the photometric values according to hardware like in conventional spectrometers but by means of a calibrating filter 22 (FIG. 1): Thus, for instance, the neodym spectrum shows prominent peaks at about 581 nm, 743 nm and 800 nm (the precise values depend on the individual filter which is a mixture of phraseodym and neodym=didymium). Said peaks can be used, by an adequate software routine, for calibrating the wavelength scale. These peaks have, at the same time, individual values for each filter. The peak of the filter used for testing at 581 nm has a constant absorption of A=2.28. Said peak can, at the same time, be used for calibrating the photometric values likewise supported by software. The measuring operation occurs as follows: The calibrating filter 22 is inserted instead of the specimen behind the exit slit 6. The medium wavelength position and the width of the spectral range are first selected and roughly adjusted by the control circuit and turning of the diffracting grate and the spring-steel strap. The absorption spectrum of the calibrating filter is exposed precisely under said measurements and thus the complete scaling or calibration is determined in a simple manner. Depending on the accuracy required, the calibration can be carried out prior to each measuring series or only occasionally at long time intervals. The more precise calibration with the aid of a calibrating lamp which emits the atom lines of specific gases like krypton or argon with very narrow half-width value is essentially more complicated, since the irradiation lamp must be changed for this purpose, which can, in turn, result in wavelength inaccuracies due to mechanical misadjustment.

In FIG. 6 a "zoomed" and corrected spectrum of a didymium filter between 500 nm and 850 nm is shown and—as chronological comparison—a rectangular oscillation of 100 Hz. This serves to demonstrate the zoom function of the scanning mirror, the spectrum center having been adjusted to 650 nm and an amplitude of the mirror oscillation that covers the indicated wavelength range has been selected.

In FIG. 7, a multiple exposure of absorption spectra with a monochromator, according to the invention, is shown. The long-wave reversal point of the mirror was chosen as the center of the spectrum of this non-corrected and non-calibrated raw spectra. The whole sequence of 48 spectra was exposed in 1.44 seconds. Each individual spectrum consists of 640 points corresponding to 640 individual wavelengths per 14 bit dispersion and was sequentially scanned within 15 milliseconds. The instant embodiment of the triggering, of course, allows the exposure of the spectrum only in one direction of movement of the oscillating mirror so that two consecutive spectra are separated by a "fly back" of 15 milliseconds. The essential peak positions are marked. It is seen here that by virtue of the suggested scanning mechanism and the construction of the monochromator, the useful time domain amounts to almost 100% and that practically no idle time occurs. In the high-speed rotating diffracting grates of a customary one-beam spectrometer, the idle time amounts to almost 90%, since only a small angular range is effectively utilizable within the rotating positions of the grate. For demonstration purposes, in the multiple spectrum of FIG. 7, the zone around the reversal point 1 of FIG. 4 was sequentially automatically scanned 48 times within 1.5 second. In the experimental arrangement used for indicating the multiple spectrum, the mirror movement could be shown only in one direction purely for reasons of the trigger technique. Thereby an idle time of 50% results in this example. But the losses due to idle time are not inherent to the system and can be circumvented by exposing the spectrum in both directions of oscillation and adequately converting it with the software.

An optical multichannel analyzer—OMA has hitherto been extensively used for quick exposure of optical spectra, which nevertheless has the following disadvantages:

1. The effective detecting area of a single diode of a diode row is extremely small and typically 20 micrometer by 2 millimeters and relatively insensitive and the photometric dynamics comparatively slow;
2. the specimen is irradiated with white light whereby the photolytic load becomes great;
3. the specimen is part of the reproductive course of the beam and thus must be absolutely transparent; turbid specimens cannot be measured;
4. spectra can be detected only in special exceptional cases and even then only with relatively small spectral ranges in the time interval of 10 milliseconds, and then also not sequentially and not without idle time. The photometric precision is poor, specially in the quick scan mode, since flashlights have only moderate reproductive precision;
5. optical multichannel analyzers are comparatively expensive and voluminous.

All the limitations mentioned do not apply to the concept introduced here. The monochromator, according to the invention, can be used not only for quick measurement of turbid and transparent specimens but can also be advantageously used in the reflection, luminescent and dispersion spectroscopy. In luminescent measurements, the chamber of the specimen is placed with the lighting unit for the exciting light directly before the entrance slit and thus serves for its part as a "source of light".

I claim:

1. A monochromator for single-beam spectrometers, comprising an enclosed housing having an entrance slit, a first optical system for collimating light entering through said entrance slit, a diffracting grate for spectral decomposition of the light entering through said entrance slit and collimated by the first optical system, a driven beam-deflecting element for scanning a monochromatic portion of the spectrally decomposed light and a second optical system for focusing the scanned monochromatic portion of light on an exit slit;

wherein said driven beam-deflecting element is a mechanically oscillating element with an adjustable amplitude of oscillation and having a scanning mirror (3) attached thereto;

an electromagnetic coil (9) spaced from said oscillating element (8) for deflecting said oscillating element (8) into resonant oscillations with electromagnetic energy; and a control circuit (10a, 10b), for periodically connecting and disconnecting current with said coil (9) to stabilize said resonant oscillation of said oscillating element (8) and for adjusting the coil current to adjust the amplitude of resonant oscillation, with a sensor (11a, 11b) for detecting the deflection of said oscillating element (8) and providing an output signal that is used as a feedback signal by said control circuit (10a, 10b);

whereby when said scanning mirror is arranged with respect to a said diffracting grate having 1200 slits per millimeter, a single sweep of the scanning mirror scans a spectral range of at least about 400 nm.

2. A monochromator according to claim 1, wherein said sensor is one of an optical, capacitative, electromagnetic and piezoelectric sensor.

3. A monochromator according to claim 1, wherein said sensor is a light barrier (11a) of one of the reflection and interruption type.

4. A monochromator according to claim 1, wherein said mechanically oscillating element (8) comprises a spring-steel strap (8), one end of the spring-steel strap (8) is firmly clamped to said housing and said scanning mirror (3) is attached to a free end of said spring-steel strap.

5. A monochromator according to claim 4, wherein said sensor is an Hall-effect sensor (11b) which is coordinated with a permanent magnet (19) on the spring-steel strap (8).

6. A monochromator according to claim 1, wherein said oscillating element (3) is pivotally movable into different fixed positions for adjusting a middle point of oscillation thereof for adjusting a middle point of the scanned spectral range.

7. A monochromator according claim 1, wherein the diffracting grate (4) is rotatably adjustable to different fixed positions for adjusting a middle point of the scanned spectral range.

8. A monochromator according to claim 1, comprising a filter (21), containing a rare earth-compound, with a sharp tapered absorption spectrum, said filter being pivotable and insertable in an irradiation path of said monochromator for simultaneously calibrating wavelength and photometric value.

9. A monochromator according to claim 1, wherein separate compartments are provided in said housing which are separated from each other by diaphragms (7), whereby one compartment has said entrance slit (1), a second compartment has said diffracting grate (4) and said driven beam-deflecting element (3) and finally a third compartment has said exit slit (6).

10. A monochromator according to claim 1, wherein the resonant frequency of said oscillating element is variable and adjustable.

11. A monochromator according to claim 1 wherein the resonant frequency of said oscillating element is adjustable to about 50 Hz and greater.

12. A monochromator according to claim 4, wherein said diffracting grate (4) is rotatably adjustable to different fixed positions.

13. A monochromator according to claim 4, wherein the resonant-frequency of said spring-steel strap (8) is variable and adjustable to about 50 Hz and greater.

14. A monochromator according to claim 4, wherein said spring-steel strap (8) is pivotally adjustable into different fixed positions for adjusting a middle point of oscillation thereof, thereby adjusting a middle point of the scanned spectral range.

* * * * *

UNITED STATES PATENT AND TRADEMARK OFFICE
CERTIFICATE OF CORRECTION

PATENT NO. : 5,497,231

DATED : March 5, 1996

INVENTOR(S) : Werner SCHMIDT

It is certified that error appears in the above-identified patent and that said Letters Patent is hereby corrected as shown below:

Title page, item [54] and col. 1,
In the Title, change "DIFFRACTING" to --DEFLECTING--

Signed and Sealed this

Fourth Day of June, 1996

Attest:

BRUCE LEHMAN

Attesting Officer

Commissioner of Patents and Trademarks